Jan. 1, 1952   N. T. NARANICK   2,581,131
COMBINATION CONTAINER PACKAGE AND HEATING DEVICE
Filed Dec. 10, 1948   2 SHEETS—SHEET 2
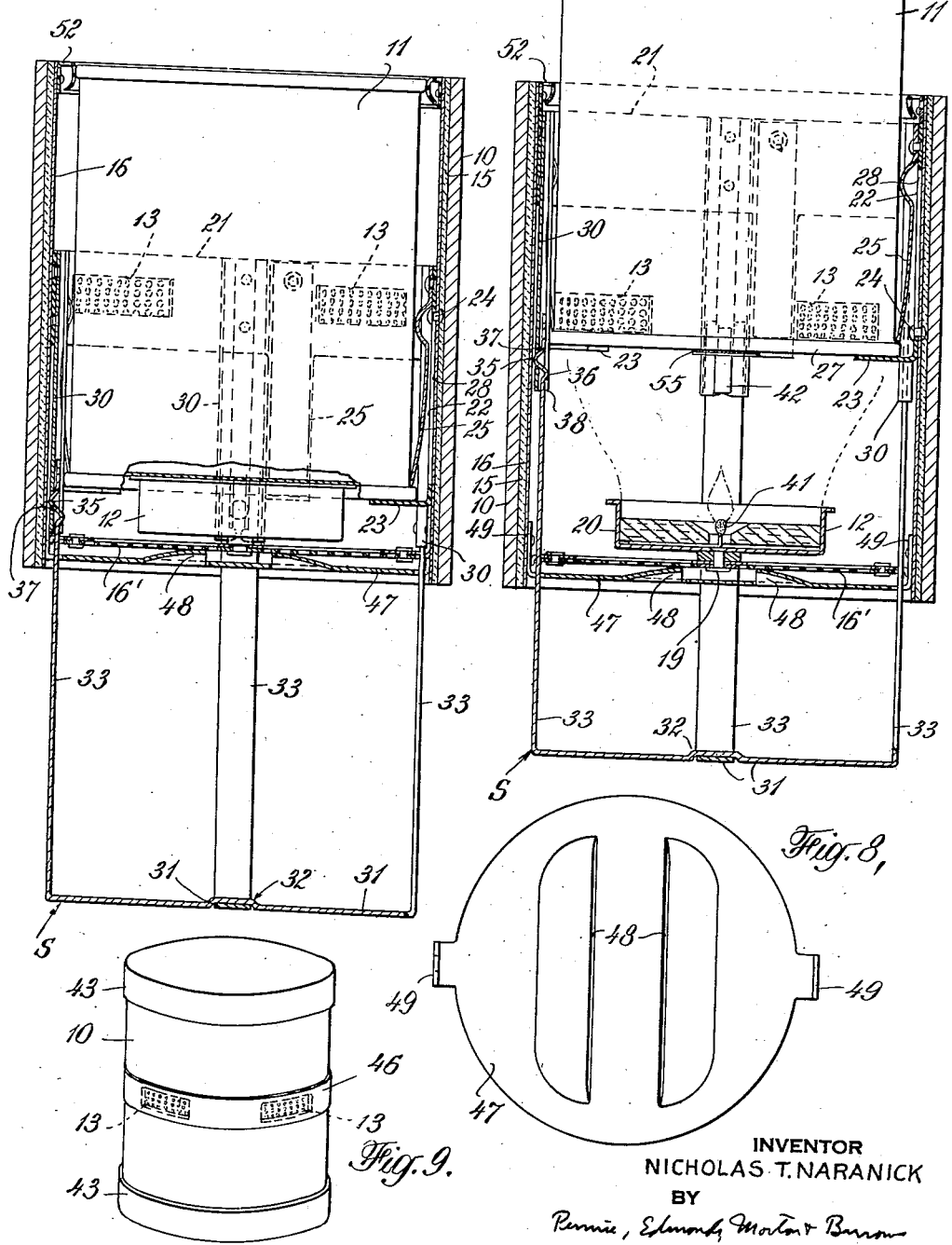
INVENTOR
NICHOLAS T. NARANICK
BY
Rennie, Edmonds, Morton & Barrow
ATTORNEYS Patented Jan. 1, 1952

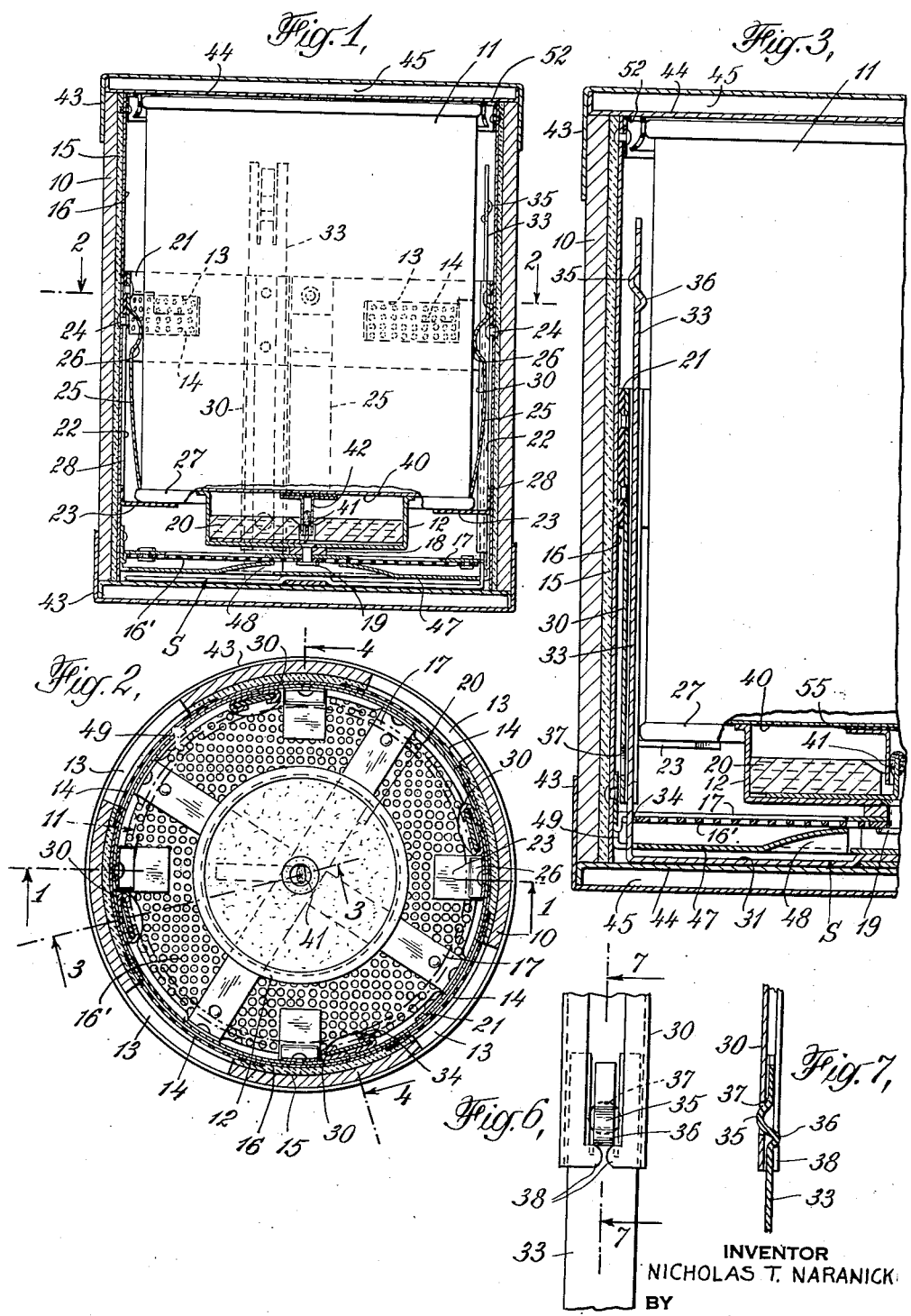

2,581,131

UNITED STATES PATENT OFFICE 2,581,131

COMBINATION CONTAINER PACKAGE AND HEATING DEVICE

Nicholas T. Naranick, Chicago, Ill.

Application December 10, 1948, Serial No. 64,476

16 Claims. (Cl. 126—262)

This invention relates to a container heating device and more particularly concerns an improved structure carrying a conventional can or like container of food or other material and incorporating means for both insulating the container against freezing during transportation or storage and heating the container contents preliminary to consumption.

It is desirable that means be provided for quickly and easily heating canned food, beverages and other products, and this without the use of auxiliary heating or cooking equipment. Such devices are particularly useful to armed forces, campers, hunters and others who are frequently forced to prepare meals without the usual cooking facilities, but a device of this nature is also useful to all consumers who are interested in expediting and simplifying the preparation of foods or other materials requiring heating. In many cases it is also desirable or necessary that canned goods be protected against freezing during transportation or storage in cold climates.

With the foregoing considerations in mind, the present invention has for an object the provision of a unitary device carrying a can or container of food or other material and incorporating means for heating the can and its contents to the temperature desired for use. A further object of the invention is the provision of a device of the type described incorporating a self-contained fuel supply and improved mechanism for igniting the fuel by a simple manipulation of the device which also opens the fuel container and provides a combustion chamber and a stand for the device. Another object is to provide a can heating device in which the heating flame is protected by flame barriers from the surrounding atmosphere so that the flame cannot ignite combustible gases in the atmosphere and so constitute a fire or explosion hazard. Another object is to provide a can heating device including a heat insulating casing acting both as a heating flue, a means for permitting handling of the heated can and an insulating barrier to protect the can against freezing in cold climates. Another object is to provide a device of the type described which is simple in construction and extremely compact, having overall dimensions, when in the inoperative position, that do not substantially exceed those of the can or other container that it carries. Other objects and advantages of the invention will become apparent from the following description of an embodiment thereof.

In describing the invention in detail, reference will be made to the accompanying drawings in which an embodiment of the invention is illustrated.

In the drawings—

Fig. 1 is a sectional elevation taken along the line 1—1 of Fig. 2, showing the device in closed or inoperative position in which it is transported or stored;

Fig. 2 is a cross-section of the device taken along the line 2—2 of Fig. 1 and viewed in the direction of the arrows;

Fig. 3 is an enlarged sectional elevation of a part of the device taken along the line 3—3 of Fig. 2;

Fig. 4 is a sectional view taken along the line 4—4 of Fig. 2, showing the device with the covers removed and the stand pulled down from the casing preliminary to moving the can into heating position;

Fig. 5 is a sectional view similar to Fig. 4, showing the device with the can pushed up by the stand to heating position;

Fig. 6 is an enlarged elevation of the end of a band track showing the connection of a stand leg thereto;

Fig. 7 is a sectional view taken along the line 7—7 of Fig. 6 and viewed in the direction of the arrows;

Fig. 8 is a top plan view of a light baffle for the lower end of the casing; and Fig. 9 is a perspective view of the device showing means for closing the outside of the casing air inlets.

The device includes a rigid cylindrical or tubular casing 10 preferably formed of heat insulating material such as cardboard, wood, molded plastic, fiberboard, or the like. The wall of the casing 10 is preferably of substantial thickness, and its inside diameter is somewhat larger than the outside diameter of a can 11 carried therein so as to leave a concentric space or flue between the casing and the can. The casing 10 is only slightly longer than the can 11, the difference in length being sufficient to accommodate the fuel cup 12 and its support, as hereinafter described. A plurality of air inlets 13 are provided through the casing wall at points spaced circumferentially about the casing and disposed just above the mid-point of the casing length, as shown in Figs. 2, 4 and 5. Screens 14 extend across the inner faces of the inlets 13 and these may be formed of perforated metal or of metal wire mesh and act in a known manner as flame barriers.

The interior of the casing is suitably treated or lined so as to be fireproof. To this end, in the disclosed embodiment, the casing 10 has an asbestos lining 15, and a thin sheet metal sleeve 16 lies within the asbestos lining. Other suitable known arrangements for rendering the inner face of the casing fireproof may, of course, be employed.

The lower end of the casing 10 is closed by a screen 16' of the same construction as the screens 14 at the vent opening and serving the same purpose. The screen 16' is shown secured to the casing by crossed braces 17 riveted to the casing walls. The fuel cup 12 is centrally disposed above the screen 16' by suitable means, such as a rivet 19 passing through the screen, the crossed braces 17, a spacing washer 18 and the bottom of the cup 12. The fuel supply employed may be of any known commercial type and is preferably a disc 20 of solid fuel fixed within the cup 12 by frictional engagement with its side wall.

The can 11 is carried by a band 21 that slidably engages the inside of the cylindrical wall of the casing. The band 21 has a plurality of spaced integral depending legs 22 terminating at their lower ends in inwardly extending feet 23 that support the can 11 by engagement with its lower end. One or more of the legs 22 is provided with a longitudinal slot 28 engaged by a rivet 24 fixed to the casing lining sleeve 16, as shown in Figs. 1, 4 and 5. The rivets 24 limit the movement of the band 21 axially of the casing by engagement with the opposite ends of the slots 28. The can 11 is centered and locked to the band 21 by a plurality of spring fingers 25, one of which is riveted or otherwise secured to the band in line with each of the depending legs 22. Each finger 25 is provided with an inwardly extending hump 26 and the lower end of each finger is biased inwardly and is spaced above the adjacent supporting foot 23 by a distance approximately equal to the thickness of the conventional bead 27 at the bottom of the can. With this arrangement the can 11 is locked to the band 21 and disposed concentrically within the casing by merely pushing the can downward within the band 21 until the lower end of the can engages the foot 23 and the lower ends of the fingers 25 snap over the can bead 27.

The band 21, with the can 11 carried thereby, is movable axially relative to the casing from the inoperative position shown in Fig. 1 to the heating position shown in Fig. 5, this movement of the band being limited by the engagement of the rivets 24 with the ends of the slots 28 in the band legs 22. In the inoperative position, the band 21 covers and so closes the air inlet openings, as shown in Fig. 1, whereas in the heating position, the band lifts the can 11 to a position where its upper end extends out of the top of the casing and its lower end lies opposite the lower edges of the air inlet openings 13 which are then opened by the upward movement of the band, as shown in Fig. 5.

The band movement is accomplished by manipulation of a stand S, as will now be explained. Four depending tracks 30 extending longitudinally along the casing wall are respectively riveted or otherwise fixed at substantially equally spaced points to the band 21. These tracks may be conveniently formed as shown by bending metal strips into flat tubular channels with longitudinal slots in their inner faces between the strip edges, as shown in Figs. 6 and 7. The stand S comprises two metal strips 31 welded or otherwise fixed together at 32 in cruciform relation and bent upon to present four upwardly extending legs 33 which respectively enter and slidably engage the four tracks 30. The legs 33 pass through slots 34 in the bottom screen 16'. In the inoperative position of the device, the upper ends of the legs 33 extend above the band 21 as shown in Figs. 1 and 3. Each of the legs has an outwardly extending boss 35 and an inwardly extending boss 36 adjacent its upper end. The boss 35 is constructed to snap into an opening 37 adjacent the lower end of the corresponding track 33 when the stand S is drawn downward, and the inwardly extending boss 36 extends through the track slot and serves as a stop to limit the downward movement of the stand by engagement with inturned ears 38 at the lower end of the track slot (Figs. 6 and 7). Engagement of the boss 35 with the track opening 37 locks the stand legs 33 to the band tracks 30, and so permits movement of the band by the stand.

The upper end of the concentric flue between the casing 10 and the can 11 is closed by a flame barrier in the form of a ring 52 of wire screening which is riveted to the upper end of the sheet metal casing lining sleeve 16 and is bent back upon itself so as to resiliently engage the can wall in both the inoperative and extended or heating positions of the can (Figs. 4 and 5). This screening, together with the bottom screen 16' and the air inlet screens 14, completely enclose the flame from the fuel cup 12.

In order that the fuel may be ignited without the use of separate matches or lighters and by simple manipulations easily performed even with gloved hands, I provide an igniter operated by movement of the can away from the fuel cup 12. In the inoperative position of the device, the bottom wall 40 of the can engages the rim of the fuel cup 12 and closes it against evaporative loss of fuel. The point of engagement between the can bottom 40 and the rim of the fuel cup 12 may be sealed with readily frangible material, such as wax. A safety match 41, or its equivalent, is fixed in a central opening in the fuel disc 20, as by bending the match stick over beneath the disc, and the head of the match lies approximately at the upper surface of the fuel disc extending through a central opening therein which may be countersunk about the match head, as shown. A match striking surface in the form of a tubular envelope 42, with the striking material on its inner face, embraces the match head closely enough to ignite the match when moved relative to the match head, and this striking surface 42 is secured to the adjacent bottom 40 of the can by suitable means, such as cement, as indicated at 55. With this arrangement, movement of the can 11 upward from the fuel cup 12 both opens the fuel cup and strikes and so ignites the match 41. This movement of the can also provides a space for combustion below the can bottom. The ignited match lights the fuel disc 20.

The ends of the casing 10 are preferably closed by removable heat insulating covers when the device is in its collapsed or inoperative position. As shown in Figs. 1 and 3, covers 43 are telescopically fitted over the opposite ends of the casing 10 and are provided with inner discs 44 spaced from the cover walls and forming dead air spaces 45 to provide thermal insulation at the ends of the casing. When the device is thus closed by the covers for shipment or storage, a strip of adhesive tape 46 is preferably secured around the casing over the air inlet openings 13, as shown in Fig. 9. This tape, in conjunction with the internal band 21, forms closures for the inlet openings 13 and provides insulating dead air spaces in these openings which prevent undue loss of heat through the inlets. With the covers 43 in place and the inlet openings closed as explained, the device may be kept for extended periods in cold climates without loss of heat sufficient to cause freezing of the food or other material in the can.

In certain uses, it is desirable that the heating operation be carried out without displaying any light, and this is particularly necessary in military operations. To this end, a light baffle in the form of a disc 47 with air admitting louvres 48 therein may be secured at the lower end of the casing 10 over the screen 16' by means of integral tabs 49 extending through slots in the screen and riveted to the casing 10.

In order to operate the device, the covers 43 and the tape 46 are first removed. The stand S is then drawn downward by grasping its crossed strips until its legs 33 are connected to the band tracks 30 by engagement of the outwardly extending bosses 35 with the openings 37 in the tracks. The stand S is then pushed upward toward the casing 10 as far as it will go, carrying with it the band 21 and the can 11. This upward movement is limited by engagement of the rivets 24 with the bottoms of the slots 28 in the band legs 22. The position of the parts when the stand S is first drawn down away from the casing to connect it with the band tracks is shown in Fig. 4, and the position thereof when the stand is thereafter pushed up toward the casing to elevate the band and the can is shown in Fig. 5. The upward movement of the can opens the fuel cup 12 and ignites the fuel disc 20 in the manner described. It also moves the band 21 away from overlapping engagement with the air inlet openings 13 so that these inlets are opened, and it also provides a combustion space over the fuel cup 12 and beneath the can. When the described operation is completed, the device is set down with the base of the stand S on a level surface and the can contents are then heated. The stand S spaces the casing 10 from the supporting surface and so permits the entry of air for combustion through the screen 16' and the light baffle disc 47, if employed. The flames and hot gases from the fuel disc travel upward in contact with the bottom and sides of the can. Auxiliary air from the inlet openings 13 causes further combustion of fuel gases from the disc in the concentric flue between the can wall and casing, with the result that the can contents is heated uniformly through the bottom and side walls of the can. The burned gases travel out of the casing through the screen ring 52 and upward along the sides of the can above the casing to further heat the can contents. The can may be punctured or opened before the start of the heating operation to prevent building up excess internal pressure during heating. The amount of fuel in the cup 12 is sufficient to supply the amount of heat needed to heat or cook the can contents as may be desired.

The device of the invention provides an extremely compact and convenient food package that insulates the food before heating, occupies a minimum of storage and shipment space and quickly and easily heats the canned product when desired. The heat insulating character of the casing 10 permits handling of the device during and immediately after heating, and serves as a convenient means by which the can may be held so that food can be eaten directly from it.

It will be understood that the invention is not limited to the specific structure disclosed but embraces equivalent constructions.

I claim:

1. In a device of the character described, the combination of an elongated open ended cylindrical casing of heat insulating material, a can support secured within said casing and slidable longitudinally thereof, a fuel supply secured within said casing adjacent one end thereof, means on said can support for carrying a can within said casing adjacent said fuel supply, means for sliding said can support longitudinally of said casing to space said can from said fuel supply, and removable heat insulating covers closing the ends of said casing when said can is adjacent said fuel supply.

2. In a device of the character described, the combination of an open ended cylindrical casing having side air inlet openings intermediate its ends, a fuel supply secured to said casing within and adjacent one end thereof, a can supporting band in said casing slidably engaging the interior thereof and movable lengthwise of said casing from a retracted position covering said openings to a raised position uncovering said openings, means on said band for securing a can thereto in concentric spaced relation to said casing, said band in its retracted position supporting said can within said casing and adjacent said fuel supply and in its raised position supporting said can in spaced relation to said fuel supply and partly protruding from said casing, removable covers for closing the ends of said casing, and removable closure means disposed over said inlet openings on the outer surface of said casing.

3. In a device of the character described, the combination of an open ended cylindrical casing of heat insulating material having side inlet openings intermediate its ends, a fuel supply secured to said casing within and adjacent one end thereof, a can supporting band in said casing slidably engaging the interior thereof and movable lengthwise of said casing from a retracted position covering said openings to a raised position uncovering said openings, means on said band for securing a can thereto, said band in its retracted position supporting said can within said casing adjacent said fuel supply and in its raised position supporting said can in spaced relation to said fuel supply to form a combustion chamber therebetween, removable heat insulating covers for closing the ends of said casing and a removable tape disposed over said inlet openings on the outer surface of said casing.

4. In a device of the character described, the combination of an open ended cylindrical casing having air inlet openings intermediate its ends, a fuel carrier secured within said casing adjacent one end thereof, a can supporting band slidably disposed within said casing in contact with the interior thereof and movable from a retracted position in which it covers said openings to a raised position in which it uncovers said openings, and means on said band for supporting a can adjacent said fuel carrier when said band is retracted and spaced from said fuel carrier to form a combustion chamber when said band is in its raised position.

5. In a device of the character described, an open ended cylindrical casing, a fuel carrying cup secured within said casing adjacent one end thereof and having an open end directed inwardly of said casing, a can support slidably secured within said casing and movable lengthwise thereof, means for securing a can to said can support in spaced relation to said casing, and a can in said securing means and movable by said support from a position within said casing in which an end thereof engages and closes said fuel cup to a position in which the can extends partly out of the casing and its end is spaced from the fuel cup to provide a combustion chamber therebetween.

6. In a device of the character described, the combination of an open ended cylindrical casing having side inlet openings intermediate its ends, a fuel supply cup secured to said casing within and adjacent one end thereof, a can supporting band in said casing slidably engaging the interior thereof and movable lengthwise of said casing from a retracted position covering said openings to a raised position uncovering said openings, and means on said band for securing thereto within and in spaced concentric relation to said casing a can having an end wall that engages and closes said fuel supply cup when said band is in its retracted position, said band when moved to its raised position moving said can away from said fuel supply cup to open said cup and provide a combustion chamber between said cup and said can.

7. In a device of the character described, the combination of an open ended cylindrical casing, a container slidably mounted therein, a combustible fuel supply fixed within said casing adjacent said container, a fuel ignition means comprising an ignitible member and a striking surface contacting said ignitible member, and means respectively securing said members to said fuel supply and said container whereby movement of said container away from said fuel supply ignites said fuel supply and provides a combustion space between said fuel supply and said container.

8. In a device of the character described, the combination of a cylindrical casing, a can slidably mounted in said casing and movable endwise thereof, a fuel cup fixed within said casing adjacent one end thereof, said can having a bottom wall engaging and closing said fuel cup when said can is moved toward said cup, a fuel supply in said fuel cup and ignition means therefor comprising an ignitible member secured to said fuel cup and a striking surface engaging said ignitible member and secured to the bottom wall of said can.

9. In a device of the character described, the combination of a cylindrical casing, a can slidably mounted in said casing and movable endwise thereof, a fuel cup fixed within said casing adjacent one end thereof, said can having a bottom wall engaging and closing said fuel cup when said can is moved toward said cup, a mass of solid fuel in said cup, a match secured to said fuel with its head adjacent the surface of said fuel, and a match striking surface engaging the head of said match and secured to the bottom of said can.

10. In a device of the character described, the combination of a cylindrical casing, a fuel supply secured within said casing adjacent one end thereof, a can support slidably secured within said casing and movable lengthwise thereof toward and away from said fuel supply, a stand for said casing movable lengthwise of said casing from one end thereof and including elements slidably engaging said can support within said casing, and interengaging means on said stand elements and said can support for locking said stand to said can support when said stand is moved from said casing whereby said can support can be moved away from said fuel supply by means of said stand.

11. In a device of the character described, the combination of a cylindrical casing, a fuel supply secured within said casing adjacent one end thereof, a can support slidably secured within said casing and movable lengthwise thereof toward and away from said fuel supply, a stand for said casing movable lengthwise of said casing from a position within said casing to a position protruding from the fuel supply carrying end of said casing, means slidably connecting said stand to said can support, and interengaging means on said slidable connecting means for locking said stand to said can support when said stand protrudes from said casing whereby said can support can be moved away from said fuel supply by means of said stand.

12. In a device of the character described, the combination of an open ended cylindrical casing, a fuel supply secured within said casing adjacent one end thereof, a can support slidably secured within said casing and movable lengthwise thereof toward and away from said fuel supply, a can carried by said support, a stand for said casing movable lengthwise of said casing from a position within said casing to a position in which it protrudes from the fuel supply carrying end of said casing, means slidably connecting said stand to said can support, interengaging means on said slidable connecting means for locking said stand against movement relative to said can support when said stand is in its protruding position, and ignition means for said fuel supply comprising interengaging ignitible and striking elements respectively secured to said fuel supply and said can.

13. In a device of the character described, the combination of an open ended cylindrical casing having side inlet openings intermediate its ends, a fuel supply secured within said casing adjacent one end thereof, a can supporting band in said casing slidably engaging the interior thereof and movable lengthwise of said casing from a retracted position in which it covers said openings to a raised position in which it uncovers said openings, means on said band for securing a can thereto, said band in its retracted position supporting a can adjacent said fuel supply and in its raised position moving the can away from said fuel supply to form a combustion chamber therebetween, a stand for said casing movable lengthwise thereof from a position within said casing to a position in which it protrudes from the fuel supply carrying end of said casing, means slidably connecting said stand to said can supporting band and interengaging means on said slidable connecting means for locking said stand against movement relative to said band when said stand is pulled to its protruding position whereby said band can be moved to its raised position by said stand.

14. In a device of the character described, the combination of an open ended cylindrical casing, a cylindrical container, means slidably mounting said container within said casing in concentric relation thereto, means for moving said container from a retracted position within said casing to a position in which it protrudes from one end of said casing, a fuel supply secured within said casing adjacent the other end of said casing, a screen secured across said fuel supply carrying end of said casing and a screen ring secured to said casing adjacent the end thereof from which said can is protruded and engaging said can in its retracted and protruding positions.

15. In a device of the character described, a cylindrical casing having air inlet openings intermediate its ends, a flame retarding screen covering said inlet openings, a flame retarding screen covering one end of said casing, a fuel supply within said casing adjacent the end thereof closed by said screen, a cylindrical can, means slidably supporting said can within said casing in concentric spaced relation thereto, means for moving said can supporting means lengthwise of said casing to move said can from a retracted position within said casing to a raised position in which it protrudes from the end of said casing opposite that covered by said screen, and a resilient inwardly biased screen ring secured within said casing adjacent the end thereof from which said can may protrude and extending across the concentric space between said casing and said can.

16. In a device of the character described, the combination of a cylindrically walled casing, a fuel supply secured within said casing adjacent one end thereof, a can supporting band within said casing slidably movable lengthwise of said casing, and means for securing a can to said band for movement thereof toward and away from said fuel supply comprising a plurality of legs extending from said band longitudinally of said casing adjacent the casing wall inturned feet on said legs extending transversely of said casing and an inwardly biased spring finger secured to said band and extending along the inner side of each of said legs and terminating adjacent but short of the foot on said leg.

NICHOLAS T. NARANICK.

REFERENCES CITED

The following references are of record in the file of this patent:

UNITED STATES PATENTS

| Number | Name | Date |
|---|---|---|
| 249,769 | Johnston | Nov. 22, 1881 |
| 1,277,872 | Crane | Sept. 23, 1918 |
| 1,324,025 | Bates | Dec. 9, 1919 |
| 1,325,515 | Hartmann | Dec. 23, 1919 |
| 1,622,494 | Cranston | Mar. 29, 1927 |
| 1,739,674 | Hohulin | Dec. 17, 1929 |
| 2,174,824 | Frank | Oct. 3, 1939 |
| 2,189,587 | Lallement | Feb. 6, 1940 |
| 2,363,474 | Schlesinger | Nov. 21, 1944 |

FOREIGN PATENTS

| Number | Country | Date |
|---|---|---|
| 212,973 | Great Britain | Mar. 18, 1924 |